Figure 1:
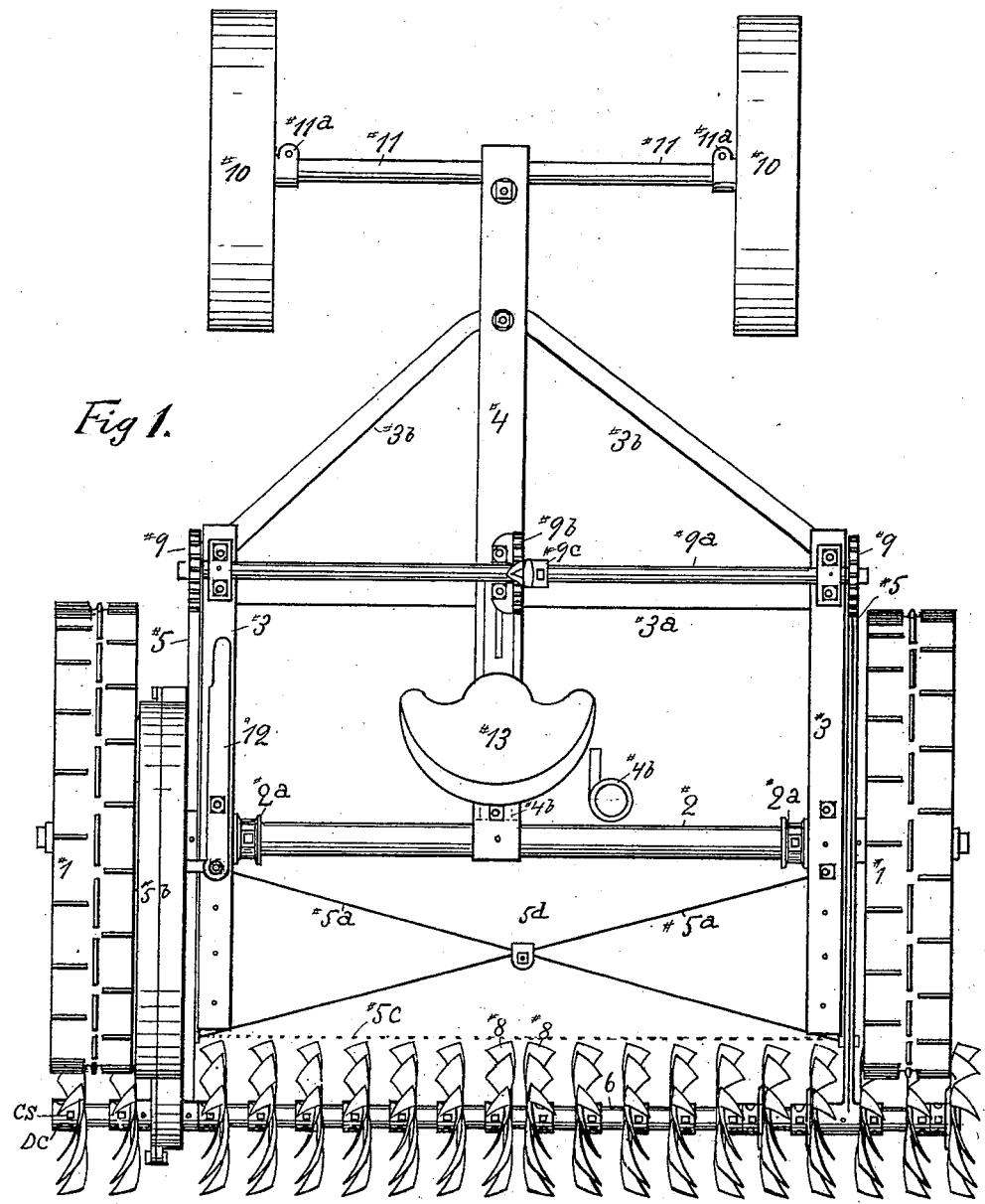

No. 646,453. Patented Apr. 3, 1900.
J. O. NAISTROM.
DISK HARROW.
(Application filed July 10, 1899.)
(No Model.) 2 Sheets—Sheet 1.

Witnesses
William W. Bartlett.
Wallace R. Bartlett

Inventor
John O. Naistrom

No. 646,453. Patented Apr. 3, 1900.
J. O. NAISTROM.
DISK HARROW.
(Application filed July 10, 1899.)
(No Model.) 2 Sheets—Sheet 2.
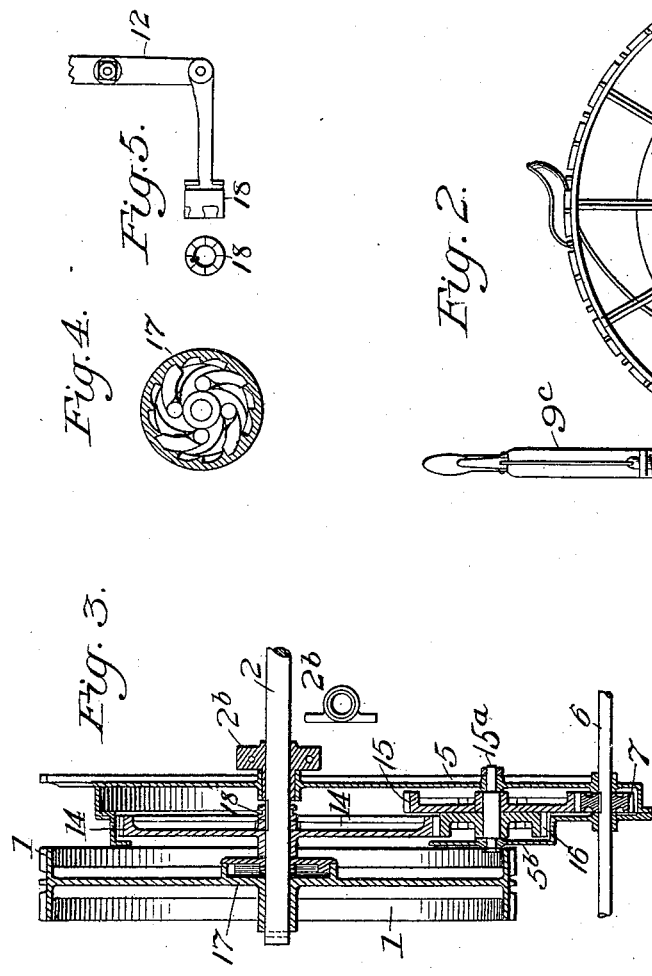
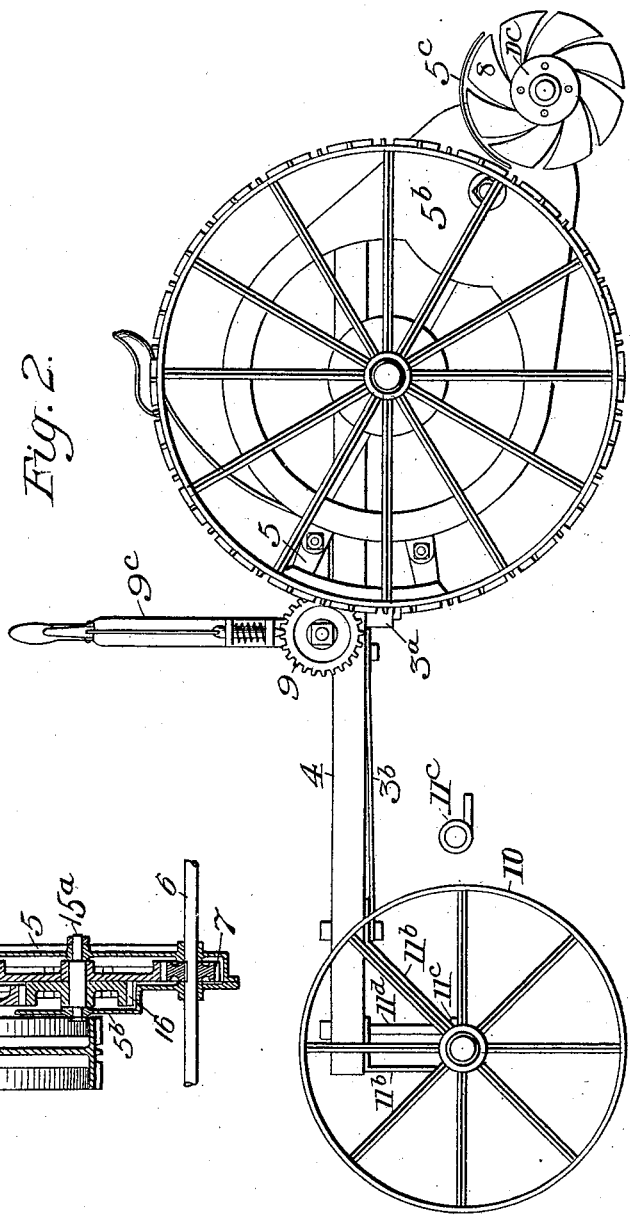
Witnesses:
Harold H. Eads.
H. J. Welles
Inventor.
John O. Naistrom

UNITED STATES PATENT OFFICE.

JOHN O. NAISTROM, OF MINNEAPOLIS, MINNESOTA.

DISK HARROW.

SPECIFICATION forming part of Letters Patent No. 646,453, dated April 3, 1900.

Application filed July 10, 1899. Serial No. 723,335. (No model.)

*To all whom it may concern:*

Be it known that I, JOHN O. NAISTROM, a citizen of the United States, residing at Minneapolis, in the county of Hennepin and State of Minnesota, have invented a new and useful Disk Harrow and Cultivator, of which the following is a specification.

My invention relates to the class of disk harrows for which an application for Letters Patent was filed by me May 27, 1898, the serial number of which is 681,957; and it consists principally in an improved construction and combination of the constituent parts of the machine, all as hereinafter described, and specifically set forth in the claims, and illustrated in the accompanying drawings, of which—

Figure 1 is a top view of the harrow; Fig. 2, a side view; Fig. 3, a cross-cut of the gears and one of the traction-wheels; Fig. 4, a cross-cut of one of the traction-wheel couplings 17; Fig. 5, a side and end view of gear-coupling 18 and part of lever 12.

Similar numbers and letters refer to similar parts throughout the several views.

This harrow is constructed so as to be operated by a horse, a team, by a hand-engine, or any suitable power.

The traction-wheels are constructed with cross-bars on the rims and a ratchet-coupling 17 at the inside of the hubs and independently journaled or mounted upon axle 2, so as to turn and operate said axle 2 in a forward direction only. Gear 14 is journaled on said axle 2 adjacent to one of the traction-wheels and provided with suitable clutches on one side to engage clutches of coupling 18, whereby said gear 14 may be turned and operated with axle 2 and the traction-wheels in a forward direction. Adjacent to said gear 14 and on axle 2 is closely and loosely mounted with groove and key clutch-coupling 18, which is adapted by an annular groove to be by means of lever 12 slid or moved forth and back on said axle 2, so as to engage or disengage the clutches of said gear 14, by means of which as the said traction-wheels and axle 2 are turned or moved forward the said gear 14 may be operated in a forward direction or in the same direction as the traction-wheels only. Close to the side of regulating-arms 5 and on said axle 2 are loosely and closely mounted box-bearings $2^b$, in which said axle 2 rotates and to which side stringers 3 are firmly bolted and combined with the cross-plate $3^a$, brace $3^b$, pole 4, and collars $2^a$, firmly set on said axle 2 at the inside of stringers 3. The rear end of said pole 4 is bolted to collar $4^b$ and running forward parallel with and between the traction-wheels is held to cross-plate $3^a$ by a suitable bolt, with nut running vertically through the said cross-plate $3^a$, pole 4, coupling-gear $9^b$, and the support of saddle 13 at their intersection. The forward-pointing end of said pole 4 is provided with support $11^b$ and adapted to be pivoted to the collar $11^c$, set to the center of axle 11 of the guide-wheels 10. It can also be applied to an extension-pole and hitched direct to horses.

As for simplicity of construction and the novel combination of the several parts at their intersection with the frame of the harrow attention may be given to the following: The same bolts, with nuts holding the box-bearings of the regulating-shaft $9^a$ to the side stringers 3, serve also to combine the ends of the said cross-plate $3^a$, stringers 3, and the brace $3^b$, respectively. One of the bolts, with nuts holding box-bearings $2^b$ to side stringers 3, serves also as a pivot for lever 12. One bolt and nut combine and hold in proper place on cross-plate $3^a$ pole 4 with gear $9^b$ and support for saddle 13, one bolt and nut hold and combine pole 4, brace $3^b$, and support $11^b$, and one bolt $11^d$ and nut combine and hold together in proper place and position axle 11, support $11^b$, collar $11^c$, pole 4, and at the same time serve as a pivot on which the guide-wheels may be turned horizontally in any direction. Braces $5^a$, as braces for regulating-arms 5, serve also as fastenings or pivots for the disk shield or cover $5^c$. Collars $11^a$ as stops on axle 11 for guide-wheels 10 serve also as hitching-straps for shafts or a pole. All of said joints are horizontally constructed and by said bolts vertically combined.

The regulating-arms 5 are mounted on bearings to balance upon axle 2 and provided with suitable bearings in the downward-pointing ends, in which is mounted and journaled the disk-shaft 6 with disks 8. The upward-pointing ends are geared and operatively connected with gears 9 and means whereby the disk-shaft 6 may be regulated. One of said regulating-arms 5, having proper gear-protectors 5$^b$, is constructed with suitable bearings, in which are mounted gears 15 and 16. The said gears 15 and 16 are firmly united and journaled upon axle 15$^a$, so as to operate with power-gear 14 and driving-gear 7. Gear 14 is mounted upon to rotate with axle 2, and gear 7 is adapted or set on shaft 6, whereby said disk-shaft 6, with disks, is operated in a forward direction or the same direction as the traction-wheels, the construction, combination, and proportion of said gears being such as to give sufficient speed of revolution to the disks to properly and thoroughly cultivate the land and soil with which they are brought in operative contact.

Regulating-arms 5 are steadily braced by braces 5$^a$ with clasp 5$^d$. To the parts of braces 5$^a$ attached to the regulating-arms 5 close to the disks 8 is attached disk shield or cover 5$^c$, as indicated by dotted line in Fig. 1 and at 5$^c$ in Fig. 2.

The disk-shaft 6, with disks 8 8, is journaled in suitable bearings in the downward-pointing ends of regulating-arms 5, properly distant outside of the periphery of traction-wheels 1, so that the disk-shaft, with disks, may extend as far out as to the outside line of the traction-wheels or farther without coming in contact therewith when in operation, and the strip of land that can be cultivated at a time for each run or turn may therefore be as wide as the full width of the harrow or wider, if desired, without leaving any wheel-tracks behind. The operative means of regulating-arms 5 consist of gears 9, firmly set on and near the ends of shaft 9$^a$, lever 9$^c$, set on shaft 9$^a$ to engage with lock-bolt coupling-gear 9$^b$ and suitably adapted and mounted upon the frame of the harrow, so as to properly operate said regulating-arms 5 and regulate said disk-shaft 6 on a circle with the center of the main axle of the harrow.

The guide-wheels 10 are independently journaled to rotate on axle 11, and said axle 11 is provided with stop or hitching collars 11$^a$ at the inside of the guide-wheels and collar 11$^c$, set in the center, on which and to which support 11$^b$, firmly bolted to the foremost end of pole 4, is resting and held in proper position by bolt 11$^d$, which also serves as a pivot on which the guide-wheels may be turned horizontally in any direction.

The disks 8 8, having collars D C and screws C S, are constructed and mounted upon disk-shaft 6, so as to be slid on and off or firmly set thereon at any desired point. Each disk is made of or in one piece of such weight and quality of material as to make it strong enough and suitable for the purpose. The blades, being in number, say, from six to sixteen and of similar size and form, extend from the periphery to a suitable distance from the center of the disks, are properly shaped and twisted on somewhat similar principle to the blades in a propeller or a wind wheel, and curved and bent to one side, right or left, in the same manner all around, with the foregoing edges sharpened and slanting or reclining, so that roots, weeds, and any obstructive matter liable to gather and lodge on and between the edges of said blades may be thrown off or slide off when the disks are rotating in operating contact with the soil. The blades of the disks may, as described, preferably be made and the disks set upon the disk-shaft so as to turn the soil to right or left, or both, as shown in Fig. 1, or as may be required in cultivating alongside of and between planted rows. The said disk or disks are furthermore adapted to be firmly set, by means of bolts and nuts or screws, onto collars (marked D C) constructed for the purpose, which are loosely and closely fitted upon disk-shaft 6, so as to be slid on and off or firmly set thereon, by means of set-screws C S, at any desired point or distance apart. Said shaft is provided with a spline to prevent said collars from turning around the same when in heavy contact with the soil.

As this invention relates to that class of disk harrows for which an application for Letters Patent was filed by me May 27, 1898, as herein previously referred to, I therefore do not claim such a combination of the machine broadly or as covered by said application, but principally the improved construction and combination of the constituent parts thereof.

What I do claim as my invention, and desire to secure by Letters Patent, is—

1. In a disk harrow and cultivator, the combination of a main axle 2 with traction-wheels independently journaled thereon and provided with coupling 17 at the hub to operate said axle 2 in a forward direction; a frame of stringers 3, cross-plate 3$^a$, brace 3$^b$ and pole 4, carrying support and saddle 13 horizontally united and by bolts with nuts vertically combined and mounted with suitable bearings, as described, wherein said axle 2 may freely turn and rotate; guide-wheels 10 and axle 11, with collars 11$^a$ firmly set at the inside of the hub of guide-wheels 10, collar 11$^c$, firmly set at the center of axle 11 and pivoted with bolts and nuts 11$^d$ to the support 11$^b$ and the foremost end of pole 4 to turn horizontally in any direction; regulating-arms 5 provided with bearings in which they are mounted to balance upon axle 2 and suitable bearings in the downward-pointing ends with disk-shaft 6 carrying disks 8 journaled therein so as to be operated in a forward direction and as may be desired outside the periphery of the traction-wheels, the upward-pointing ends of said arms 5 being geared and operatively connected with gears 9 and means whereby the said disk-shaft with disks may be regulated, as shown and for the purpose described.

2. In a disk harrow and cultivator, the combination of axle 2 and the traction-wheels; a frame, regulating-arms 5, disk-shaft 6, couplings 17 and 18 and a gear 14 thereon mounted as described, said couplings 17 and 18 being adapted on said axle 2 to rotate therewith and respectively engage with the said traction-wheels and gear 14, whereby, as the said traction-wheels are turned, or moved forward, said axle 2 and gear 14 may be operated in a forward direction; gears 15 and 16 firmly combined and properly journaled to revolve upon axle 15ª and operatively connected with gears 14 and 7, gear 7, adapted on to operate disk-shaft 6, with disks 8, in a forward direction, or the same direction as the traction-wheels, with suitable speed of revolution to thoroughly cultivate to any desired depth the soil, with which said disks, are brought in operating contact, as for the purpose shown and described.

3. In a disk harrow and cultivator, the combination of the traction-wheels provided with couplings at the hubs and journaled upon to operate axle 2 in a forward direction, regulating-arms 5, disk-shaft 6 and disks 8 mounted on said alxe 2; a frame provided with suitable bearings wherein said axle 2 may turn and rotate, and whereon is mounted and journaled regulating-shaft 9ª with gears 9 to operatively engage the upward-pointing ends or sides of arms 5, a lever provided on said shaft 9ª adjacent to the coupling 9ᶜ to engage with lock-bolt said coupling, whereby the disk-shaft, with disks, journaled and operated in the downward-pointing ends of arms 5 may be regulated on a circle with the center of the main axle of the harrow outside of the periphery of the traction-wheels as may be required, substantially as shown and described.

4. In a disk harrow and cultivator, the combination of the traction-wheels and axle 2 carrying a frame with suitable bearings, wherein to turn and rotate, regulating-arms 5 provided with bearings to be balanced on said axle 2 and disk-shaft 6 carrying disks 8 suitably journaled in bearings in the downward-pointing ends of said arms 5, the upward-pointing ends adapted with regulating means whereby said disk-shaft may be regulated; a combination of gears carried by said axle 2 and said arms 5 operatively connected with the traction-wheels and disk-shaft 6, whereby said disk-shaft may be operated with suitable speed of revolution in a forward direction outside of the periphery of the traction-wheels, as may be desired and disks 8, bladed and adapted to be mounted on said shaft as described whereby to thoroughly cultivate the land, or soil, as shown and specified.

5. In a disk harrow and cultivator the combination of axle 2 and the traction-wheels 1 with couplings 17 at the hubs to engage and operate axle 2 in a forward direction, a frame and regulating-arms with bearings wherein said axle 2 may turn and operate, a disk-shaft 6, gear 7 and disks 8, journaled in the downward-pointing ends of regulating-arms 5 as specified, the upward-pointing ends of said arms 5 being geared and operatively connected with means of regulation, a clutch-coupling 18 adapted to turn with axle 2 and slide forth and back thereon to engage gear 14, a lever 12 whereby to operate said coupling 18 as described and a combination of gears 15 and 16 between said gear 14 and gear 7, whereby said disk-shaft 6, with disks 8, may be operated in a forward direction, said disks 8 being bladed and adapted to be mounted upon said disk-shaft as described whereby to cultivate and turn the soil to right and left, as may be required, and provided with disk-covers 5ᶜ, substantially as shown and for the purpose specified.

6. In a disk harrow and cultivator of the class specified, the traction-wheels, the guide-wheels, their axles, a frame and the regulating-arms thereon mounted, a disk-shaft journaled in said arms, the disks carried by said shaft, the gear-protectors, the disk-covers, and the means whereby the said shaft and disks may be operated controlled and regulated, all substantially as shown and described.

JOHN O. NAISTROM.

Witnesses:
WILLIAM W. BARTLETT,
WALLACE R. BARTLETT.